United States Patent Office
3,545,942
Patented Dec. 8, 1970

3,545,942
LINEAR PHOSPHONITRILIC CHLORIDE DERIVATIVES CONTAINING TERMINAL ORGANIC GROUPS
Rip G. Rice and Robert M. Murch, Ashton, and Dorothy C. de Vore, Baltimore, Md., assignors to W. R. Grace & Co., New York, N.Y., a corporation of Connecticut
No Drawing. Filed Oct. 12, 1967, Ser. No. 674,744
Int. Cl. C01b 25/10; C08f 27/08; C07d 105/02
U.S. Cl. 23—357         12 Claims

ABSTRACT OF THE DISCLOSURE

Linear phosphonitrilic chloride derivatives are prepared which are hydrolytically and thermally stable. These derivatives contain organic groups co-valently bonded to the terminal phosphorous atoms on the chain, the terminal groups chosen from aryloxy, alkoxy, amino, and imino substituents.

---

This invention relates to the synthesis of linear phosphonitrilic chloride polymers having organic groups covalently bonded to the terminal phosphorous atoms. A more particular embodiment of this invention relates to the preparation of a family of linear phosphonitrilic chloride derivatives which have good thermal and hydrolytic stability.

The phosphonitrilic halide polymer family has been investigated by many workers. However, useful materials have never been developed from the polymers, owing to the hydrolytic instability of the halogen-phosphorus bond. For instance, an "inorganic rubber" which is a high molecular weight phosphonitrilic halide has a strong tendency to depolymerize when heated above 350° C. and hydrolyzes when exposed to atmospheric moisture.

Recently, workers in the field have been experimenting with a fluid system based on linear phosphonitrilic halides having less thermally sensitive constituents substituted in place of some or all of the halogen substituents.

However, to our knowledge it has not yet been possible in the art to successfully synthesize a linear phosphonitrilic chloride derivative which is both hydrolytically and thermally stable.

We have now produced a series of just such linear phosphonitrilic chloride derivatives.

In summary, we have taken a linear phosphonitrilic chloride polymer, which is an insoluble (in benzene) waxy solid having a molecular weight of about 700–1700 and have first controllably heated this material under an inert atmosphere at about 250° C. for 2 to 8 hours. The product may be described as a viscose liquid, soluble in benzene, and having a structure as follows:

(I) 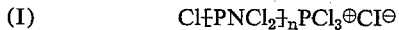

wherein $n$ is an integer from about 3 to about 15.

Structure I is then reacted with an organic compound chosen from the group consisting of phenols, phenoxides alcohols, alkoxides and primary and secondary alkyl and aryl amines, in an inert solvent, in the presence of heat for from 0.25 to 20 hours. The final product is a linear phosphonitrilic derivative having up to 5 organic groups substituted on one or both of the terminal phosphorus atoms on the chain, and the terminal organic groups being aryloxy, alkoxy, imino, and amino groups, respectively. Nuclear magnetic resonance (NMR) spectroscopy confirms that the chosen organic compound will react first with the chloride ions attached to the terminal phosphorus atoms and will not react, under our inventive conditions, with the chloride ions attached to phosphorus atoms in the internal $\{PNCl_2\}$ unit.

Our final product exhibits astonishing thermal and hydrolytic stability. Although we do not wish to be bound by theory, it is our belief that these stabilities are direct results of the organic substituents being substituted only on the terminal phosphorus atoms of the chain. We have found that if substitution takes place on phosphorus atoms in the internal $\{PNCl_2\}$ units, an immediate decrease in thermal stability is observed.

For instance, see Table I, which affords a comparison among the unsubstituted phosphonitrilic chloride polymer (A); our inventive terminal substituted organic phosphonitrilic chloride (B); a terminal substituted ionic phosphonitrilic chloride (C) prepared using the method given in British Pat. 883,587; and a completelyy substituted organic (both internal and terminal) phosphonitrilic chloride (D), prepared using the method given in Allcock et al., Inorganic Chemistry, vol 5, p. 1716 (1966).

TABLE I

| Phosphonitrilic chloride | Hydrolytic stability | Thermal stability |
|---|---|---|
| A | Poor | Good (>300° C.). |
| B | Good | Do. |
| C | Very poor | Very good (>500° C.). |
| D | Very good | Poor (>100° C.). |

It may be seen that our inventive composition combines good thermal and hydrolytic stability in the same composition at the same time, unlike anything heretofore produced in the art.

Although our examples, which will appear hereinafter are limited to relatively low molecular weight phosphonitrilic chloride derivatives, we do not wish to be bound thereby. Our inventive process is equally applicable to substitution on a higher molecular weight phosphonitrilic chloride polymer. For example, the linear high molecular weight phosphonitrilic polymers can also be terminally reacted following our inventive process. It is only necessary that the unsubstituted chloride polymer of molecular weight about 550–1500 be first polymerized before reacting with the suitable organic compound. In other words, we do not polymerize our relatively low molecular weight compounds having the terminal organic substituent, but rather first polymerize, then substitute the chosen organic compound.

It should be noted that the starting material used in our inventive process is produced by reacting an excess of phosphorus pentachloride with ammonium chloride under anhydrous conditions in a refluxing solvent. This process and the material produced (our starting material) are old in the art.

We will now more fully describe the process conditions. The starting material which is produced using conventional methods, is a benzene-insoluble, waxy, linear phosphonitrilic chloride polymer. Its theoretical formula is (II) 

wherein $n$ is an integer from 3–15. It has a molecular weight of about 550–1500. However, due to the excess of phosphorus pentachloride used in the reaction, the actual structure of the starting polymer has been identified as:

(III) 

wherein $n$ is an integer from 3–15, and the molecular weight is about 700–1700.

We have now determined that only Structure (I) can be controllably substituted by an organic compound on the two terminal phosphorus atoms. We have also now determined that Structure (I) can be prepared successfully by using our inventive conditions. We have determined that our inventive conditions result in the evolution of $PCl_5$ from the polymer, with the subsequent production of (I)    Cl[PNCl₂]ₙPCl₃⊕Cl⊖

If our exact inventive conditions are not followed, polymerization to the inorganic rubber or polyphosphonitrilic chains will occur. The heating step necessary to prepare Structure (I) from Structure (III) can be carried out at preferably 245–255° C., and operably at 240–260° C. This heating must be in an inert atmosphere, such as nitrogen, or any inert gas. The pressure used is that of the atmosphere, or slightly higher than atmospheric. Generally, we can operate at a pressure of 1–2 atmospheres.

The time for completing the reaction is limited by two considerations: the final molecular weight of the product, and the risk of conversion of the product to the "inorganic rubber." This time can be predicted, however, by monitoring the phosphorus pentachloride evolved, which is recovered as the heating progresses. Generally, we have found that the end point of the reaction occurs about 2–8 hours after the heating is first started. Of course, it is obvious that the greater times given in our ranges give correspondingly greater molecular weights in the final product.

The phosphonitrilic chloride polymer obtained is that described in Structure (I). This polymer can now be reacted with a compound chosen from the group consisting of phenols, phenoxides, alcohols, alkoxides, primary amines and secondary amines. By the term "phenol" is meant an aromatic hydroxy compound chosen from the group consisting of phenol, substituted phenols, and other aromatic hydroxy compounds having 6–14 carbon atoms in the aromatic system. The substituted phenols and phenoxides can have up to three substituents on the phenol ring, the substituents being chosen from the group consisting of —OR′, —R′, —R′X, and —X, wherein R′ chosen from the group consisting of an aromatic ring having 6–10 carbon atoms, and alkyl group containing 1–8 carbon atoms, X is halogen, and O is oxygen. Phenoxides are defined as the alkali metal salts of the previously defined phenols. Suitable phenols are phenol, o-cresol, p-bromophenol, o-bromophenol, m-ethylphenol, o-, p-diethylphenol, m-chlorophenol, m-bromohexylphenol, m-phenoxyphenol, o-ethoxy, p-methoxyphenol, α-naphthol, β-naphthol, anthranol, and others. We generally refer to the phenols as "AROH." The phenols or the phenoxides after reacting with the chlorine on the terminal phosphorus atoms of the phosphonitrilic chloride polymer, result in the substitution of an "aryloxy" group as the terminal organic group on the polymer.

By the term "alcohol" is meant an aliphatic alcohol having 1–18 carbon atoms in the chain. The aliphatic alcohol can have substituents on the chain as described above. Alkoxides are defined as the alkali metal salts of the alcohols. This compound can be represented as "R″OH," R″ signifying the aliphatic group. Suitable alcohols are methyl alcohol, ethyl alcohol, isopropyl alcohol, t-butyl alcohol, n-propyl alcohol, pentanol-3, hexanol-3, 2-ethylbutanol-1, octanol-2, α-phenylethyl alcohol, 2-bromoethyl alcohol, benzyl alcohol, cinnamic alcohol, and others. The alcohols after reacting with the chlorine on the terminal phosphorus atoms of the phosphonitrilic chloride polymer, result in the substitution of an "alkoxy" group as the terminal organic group on the polymer.

By the term "secondary amine" is meant a compound chosen from the group consisting of HNR₂ wherein R is a substituted or unsubstituted alkyl group having 1–18 carbon atoms, or a substituted or unsubstituted aryl group having 6–14 carbon atoms in the ring. R may be the same or different in the same amino compound. The term "secondary amine" is generally accepted in the art to represent an amine having but one hydrogen (H) on the nitrogen (N) atom. Suitable secondary amines are dimethylamine, diethylamine, N-ethylbenzylamine, ethylaniline, methyl-m-toluidine, N-butylaniline, N-benzylaniline, di-p-tolylamine, methyl-β-naphthylamine, ethylmethylamine and others. The secondary amine, after reacting with the chlorine on the terminal phosphorus atoms of the phosphonitrilic chloride polymer, results in the substitution of an "amino" group as the terminal organic group on the polymer.

By the term "primary amine" is meant a compound chosen from the group consisting of

H₂NR

R having substantially the same meaning as above defined. The term "primary amine" is generally accepted in the art to represent an amine having two hydrogen atoms (H) on the nitrogen (N) atom. Suitable primary amines are methylamine, n-propyl amine, aniline, m-toluidine, o-chloroaniline, 3,5-dimethylaniline, o-anisidine, 2,5-dichloroaniline, o-iodoaniline, 2,4,6-trichloroaniline, m-nitroaniline, 3,4-dichloroaniline, and others. The primary amine, after reacting with the chlorine on the terminal phosphorus atom of the phosphonitrilic chloride polymer, results in the substitution of an "imino" group as the terminal organic group on the polymer.

Typical examples of these four organic compounds react in the following way with Structure (I) as follows:

(1) R″OH (ethyl alcohol):

Cl[PNCl₂]₂PCl₃⁺Cl⁻+C₂H₅OH→
                        Cl[PNCl₂]₂PCl₃OC₂H₅+HCl (2) AROH (phenol):

Cl[PICl₂]₂PCl₃⁺Cl⁻+2C₆H₅OH→
                        Cl[PNCl₂]₂PCl₂[OC₆H₅]₂+2HCl (3) R₂NH (dimethylamine):

Cl[PNCl₂]₂PCl₃⁺Cl⁻+4[CH₃]₂NH→
                        Cl[PNCl₂]₂PCl₂[N(CH₃)₂]₂+2(CH₃)₂N·HCl (4) RNH₂ (aniline):

Cl[PNCl₂]₂PCl₃⁺Cl⁻+C₆H₅NH₂→
                        Cl[PNCl₂]₂PCl₂NC₆H₅+2HCl

These general reactions will be demonstrated more fully in the following examples:

EXAMPLE I

Preparation of linear phosphonitrilic chloride—structure I

Finely divided ammonium chloride is prepared from interacting an excess of HCl with NH₃ (51.0 g., 3.0 moles) in 2000 milliliters of anhydrous chlorobenzene. Phosphorus pentachloride (780 grams or 3.78 moles) is added to this slurry. The reaction mixture was stirred and refluxed under dry nitrogen for 3 hours. Hydrogen chloride was collected and measured by titration with 2 N sodium hydroxide. The reaction was cooled when 12.0 moles of hydrogen chloride had been evolved. (A theoretical 12.0 moles of hydrogen chloride would be evolved.)

Work-up of the reaction mixture yielded: 670 grams of benzene-insoluble, chloroform-soluble, waxy, linear phosphonitrilic chloride polymer (82% yield) and 120 grams of petroleum ether soluble white crystals (15% cyclic compounds). NMR technique demonstrated that this polymer structure was that of Structure (III), i.e., Cl[PNCl₂]ₙPCl₃⁺PCl₆⁻

This low molecular weight linear phosphonitrilic chloride was placed in a resin kettle fitted with a nitrogen inlet, a stirrer and an exhaust tube condenser. The resin kettle was heated to 250° C.±10° C. for a total of 6 hours while stirring under a blanket of dry nitrogen. At the end of this time a phosphonitrilic chloride polymer was recovered having Structure (I), i.e., Cl[PNCl₂]ₙPCl₃⁺Cl⁻

The recovered polymer had a molecular weight of about 800, n being about 3–4.

EXAMPLE II

Reaction with sodium phenoxide

The linear phosphonitrilic chloride prepared in the same manner as in Example I (Structure I) was dissolved in dry methylene chloride (1 mole) and 1 mole of freshly prepared sodium phenoxide slurried in dry methylene chloride was slowly added. The reaction mixture was kept under dry nitrogen.

After 4 hours, the reaction was complete, as evidenced by a precipitate of one mole of NaCl which was removed by filtration, weighed and characterized.

The product recovered was a monosubstituted phenoxy phosphonitrile chloride having the structure:

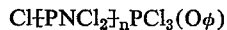
$$Cl[PNCl_2]_n PCl_3(O\phi)$$

$n$ being 5.

This compound was a liquid having a viscosity of 735 centistokes at 100° F., and the following elemental analysis: 22.6% P, 9.0% N, 57.9% Cl, 9.6% C, 0.8% H which is appropriate for $Cl[PNCl_2]_5 PCl_3 OC_6H_5$.

Experimentation with the phenoxylated polymer indicated good to excellent hydrolytic and thermal stability.

EXAMPLE III

Reaction with dimethylamine

Using the same general procedure of Example II, 1 mole of the linear phosphonitrilic chloride was reacted with 2 moles of dimethylamine in chlorobenzene. The reaction mixture was maintained at room temperature or below by means of a cooling bath. The mono-aminated phosphonitrilic chloride

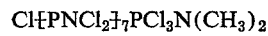
$$Cl[PNCl_2]_7 PCl_3 N(CH_3)_2$$

was recovered. It showed similarly improved hydrolytic stability.

EXAMPLE IV

Reaction with aniline

Following the same general procedure of Example III, phosphonitrilic chloride and aniline were reacted at solvent reflux temperature. After 18 hours, a derivative having the following structure:

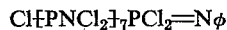
$$Cl[PNCl_2]_7 PCl_2=N\phi$$

was isolated. This monomer has a tendency to dimerize to a structure which may be described as

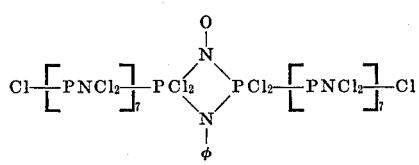

EXAMPLE V

The reaction with sodium phenoxide as described in Example II was repeated, except that the linear phosphonitrilic chloride used was Structure III, i.e.,

$$Cl[PNCl_2]_n PCl_3^+ PCl_6^-$$

After 4 hours, the contents of the reaction vessel were analyzed. Results indicated that substitution of the phenoxy groups had taken place on both the terminal phosphorus atoms of the cation or on the anion, and that this mixture of products was significantly less thermally stable and less stable towards hydrolytic attack.

EXAMPLE VI

Reaction with phenol

Using the same general procedure as Example II, one mole linear phosphonitrilic chloride was combined with one mole phenol in chlorobenzene. The evolution of one mole HCl indicated the completion of the reaction. The product, isolated by removal of the solvent, was a viscous oil having a refractive index at 25° C. of 1.5988 and a viscosity at 100° F. of 390 centistokes. The elemental analysis was correct for monophenoxylated linear phosphonitrilic chloride.

EXAMPLE VII

Reaction with aliphatic alcohol

Using the same general procedures as Example II, one mole of linear phosphonitrilic chloride was combined with one mole ethanol in anhydrous chlorobenzene. Evolution of HCl (1 mole) indicated the completion of the reaction. Analysis and physical properties indicated that the product isolated was monoethoxylated linear phosphonitrilic chloride.

Having fully described our invention, what is claimed is:

1. A process for preparing a linear phosphonitrilic chloride having a molecular weight of about 700–1700 and a formula:

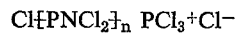
$$Cl[PNCl_2]_n PCl_3^+ Cl^-$$

which comprises heating

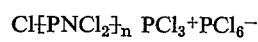
$$Cl[PNCl_2]_n PCl_3^+ PCl_6^-$$

wherein $n$ is an integer from about 3 to about 15, at 240–260° C. in an inert atmosphere, for 2 to 8 hours, and recovering the product.

2. The process of claim 1 in which the heating temperature is at about 250° C.

3. The process of claim 1 in which the inert atmosphere is nitrogen.

4. The process of preparing a thermally and hydrolytically stable linear phosphonitrilic chloride derivative which comprises heating for from 0.25 to 20 hours in an inert solvent, a linear phosphonitrilic chloride having the formula

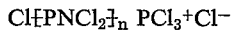
$$Cl[PNCl_2]_n PCl_3^+ Cl^-$$

with a phenol consisting of (1) phenol, substituted phenol, and aromatic hydroxy compounds having 6–14 carbon atoms in the aromatic system; (2) with a phenoxide consisting of alkali metal salts of phenols, alkali metal salts of substituted phenols, and aromatic phenoxy compounds having 6–14 carbon atoms in the aromatic system; (3) with an alcohol consisting of lower aliphatic alcohols having 1–18 carbon atoms in the chain, and substituted lower aliphatic alcohols having 1–18 carbon atoms in the chain; (4) with an alkoxide consisting of alkali metal salts of lower aliphatic alcohols having 1–18 carbon atoms in the chain, and alkali metal salts of substituted lower aliphatic alcohols having 1–18 carbon atoms in the chain; and (5) with an amine consisting of secondary and primary amines, said secondary amine having the formula $HNR_2$ and said primary amine having the formula $H_2NR$ wherein H is hydrogen, N is nitrogen, and R is chosen from the group consisting of lower alkyls having 1–18 carbon atoms in the chain, substituted lower alkyls having 1–18 carbon atoms in the chain, aryls having 1–18 carbon atoms in the chain, and substituted aryls having 1–18 carbon atoms in the chain.

5. The process of claim 4 in which the alcohol compound is ethanol.

6. The process of claim 4 in which the secondary amine compound is dimethylamine.

7. The process of claim 4 in which the primary amine compound is aniline.

8. As a composition of matter, a thermally and hydrolytically stable linear phosphonitrilic chloride derivative consisting of a linear phosphonitrilic chloride polymer having the structure

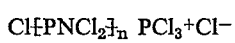
$$Cl[PNCl_2]_n PCl_3^+ Cl^-$$

in which $n$ is an integer from about 3 to about 15, and having up to 5 organic groups co-valently bonded to the terminal phosphorous atoms on the chain, said organic groups chosen from the group consisting of aryloxy, alkoxy, amino and imino substituents.

9. The composition of matter described in claim 8, in which the chosen organic group is aryloxy.

10. The composition of matter described in claim 8, in which the chosen organic group is alkoxy.

11. The composition of matter described in claim 8, in which the chosen organic group is amino.

12. The composition of matter described in claim 8, in which the chosen organic group is imino.

References Cited

UNITED STATES PATENTS

| 3,026,174 | 3/1962 | Paddock | 23—357 |
| 3,449,091 | 6/1969 | Nichols | 23—357 |
| 2,192,921 | 3/1940 | Lipkin | 260—927N |
| 2,866,773 | 12/1958 | Redfarn | 260—47P |

OSCAR R. VERTIZ, Primary Examiner

H. S. MILLER, Assistant Examiner

U.S. Cl. X.R.

260—47, 927